Sept. 29, 1931.   W. G. BURNS ET AL   1,825,261
MIXING APPARATUS
Filed April 12, 1928   3 Sheets-Sheet 1
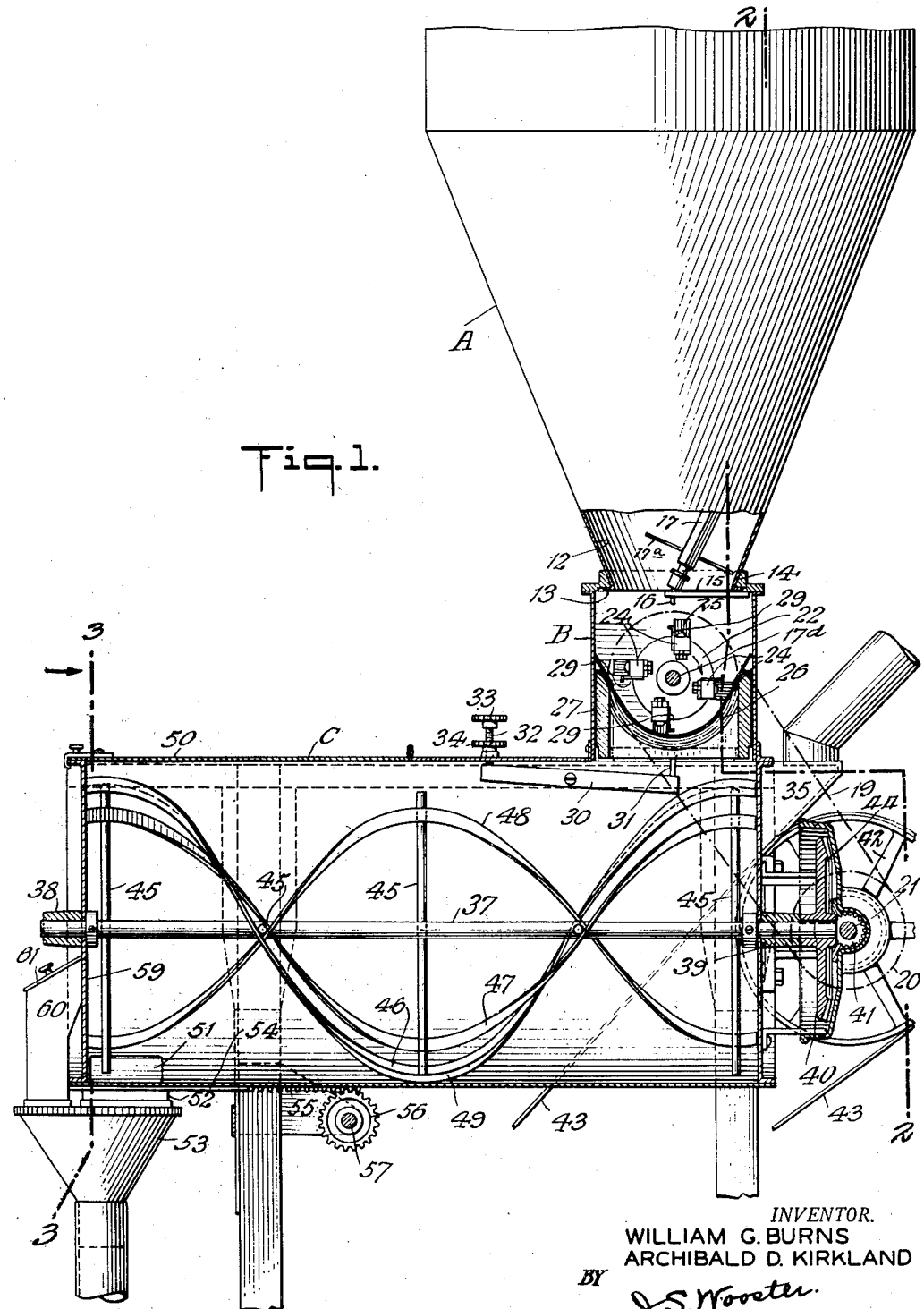
INVENTOR.
WILLIAM G. BURNS
ARCHIBALD D. KIRKLAND
BY
J. S. Wooster
ATTORNEY

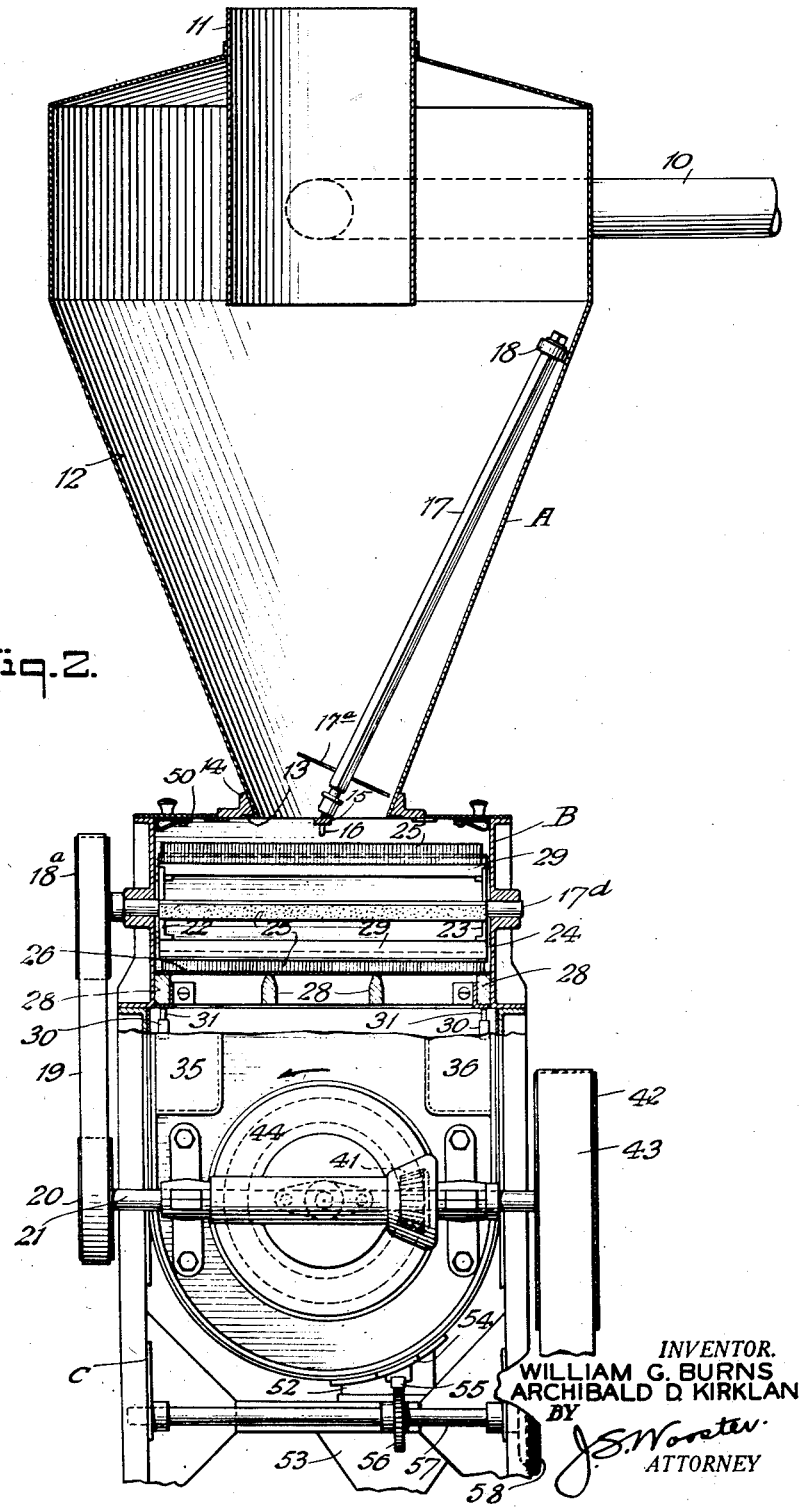

Sept. 29, 1931.  W. G. BURNS ET AL  1,825,261
MIXING APPARATUS
Filed April 12, 1928   3 Sheets-Sheet 3

INVENTOR.
WILLIAM G. BURNS
ARCHIBALD D. KIRKLAND
BY
J. S. Wooster
ATTORNEY

Patented Sept. 29, 1931

1,825,261

UNITED STATES PATENT OFFICE

WILLIAM G. BURNS AND ARCHIBALD D. KIRKLAND, OF NEW YORK, N. Y., ASSIGNORS TO JABEZ BURNS & SONS, INC., OF NEW YORK, N. Y., A CORPORATION OF NEW YORK

MIXING APPARATUS

Application filed April 12, 1928. Serial No. 269,517.

This invention relates to apparatus for mixing comminuted materials such as ground coffee and chaff.

By the ordinary practice, the coffee manufacturer grinds the coffee and either leaves the chaff therein in large flakes which is objectionable to some classes of customers, or removes the chaff and stores it either to sell or throw away. If separated chaff is ground to a degree of fineness approximating that of the cut or ground coffee or to a finer degree and then mixed therewith in the natural proportion occurring in the bean, the mixture is not only homogeneous and non-stratifying, but has advantages giving improved cup qualities when infused.

The principal object of this invention is to provide a simple, compact apparatus for thoroughly mixing materials such as ground coffee and chaff in the desired proportions. The apparatus is adapted to be used in direct association with standard apparatus for granulating coffee and separating the chaff therefrom, and may have a chaff grinder connected directly thereto.

The invention comprises a mixing drum which is provided with means whereby a predetermined reserve amount of mixed material is constantly kept in the mixer, the material being mixed back and forth therein and continually overflowing through an elevated discharge at one end. By this apparatus the coffee manufacturer avoids the necessity of separately storing the coffee and the chaff and by attaching this compact apparatus to his coffee grinder, or granulator, can achieve a substantially full automatic operation on the coffee from the coffee bean to the final proper mixture of ground coffee and chaff which can be either bagged, canned or stored in bins.

Ground coffee and chaff are fed into the same end of the drum and the mixture is then moved back and forth by spirally disposed mixing blades, some of which move it in one direction and others in the opposite. Those tending to move it from the discharge end toward the inlet end are spaced from the wall of the drum and are preferably greater in number so as to tend to move the material more toward the inlet than the discharge end. As the material is thus moved back and forth and tumbled around and since a definite quantity is kept in the drum all the time, due to the elevated discharge opening, a thorough mixture is insured.

The invention is illustrated in the drawings of which,

Fig. 1 is a side elevation, partly in section, of the apparatus;

Fig. 7 is a partial end elevation of the mixer showing a still further modification of a discharge gate and operating device therefor;

Figure 3:
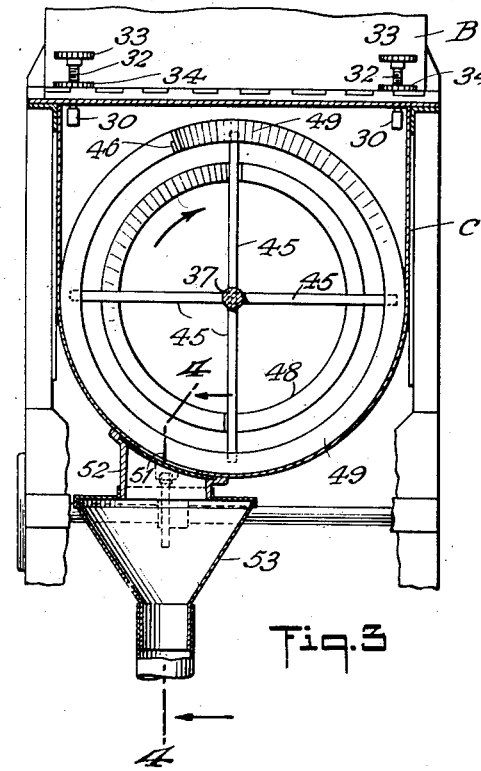
Fig. 3 is a transverse section through the mixing device taken on the line 3—3 of Fig. 1.

The preferred form of the invention, as illustrated in the drawings, comprises the combination of a separator A, a grinder B, and a mixer C. The separator is of the usual conical centrifugal type having a material inlet pipe 10, an air discharge pipe 11 and a conical casing 12 tapering in an inverse manner toward a bottom opening through which the material discharges. The bottom of the separator is provided with an outwardly extending flange 13 which is disposed between the top of the casing of grinder B and a ring 14. The ring 14 is sufficiently loose so that the separator can be rotated to dispose the inlet pipe 10 in any desired position with relation to the rest of the apparatus.

Figure 2:
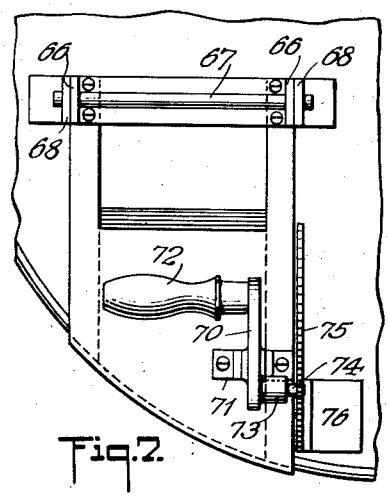
Fig. 2 is a vertical transverse section through the apparatus taken on the line 2—2 of Fig. 1.

Fastened to the ring 14 is a bar 15 which extends radially inward across the discharge opening of the separator A. This bar has an aperture to receive a bent rod 16 on the lower end of a square bar 17. This bar extends upwardly along the curved wall of the separator and has at its upper end a roller 18. Near its lower end, bar 17 is provided with a cross bar or wire 17a. The bar 17, due to the whirling action of the air and material in the centrifugal separator A, is rotated around the casing, the roller 18 traveling on the wall of the separator. This causes a rotary motion of the bar which in conjunction with the bent rod 16 and cross bar 17a, will cause a stirring action in the material in the top of the grinder B and the bottom of the separator A so that the chaff will not become clogged in the apparatus. The grinder B comprises a rectangular casing in which a shaft 17d is longitudinally mounted. This shaft carries a pulley 18a at one end, connected by a belt 19 to a pulley 20, mounted on a shaft 21 extending across the inlet end of the machine. The shaft 17d is provided at each end within the grinder casing with spider frames 22 and 23, supporting as shown four longitudinally extending brush bars 24. These brush bars are provided with brush bristles 25 which are of fairly heavy material. The brush shaft 17d rotates in the direction of the arrow shown in Fig. 1 and the brushes in rotating sweep over the upper surface of a screen 26 which is arranged in the grinder casing in the form of a trough. This screen is preferably of quite a fine mesh, such as a 40 or 45 mesh, and is supported from the upper edge of an open screen frame 27 of the same dimensions as the interior of the grinder casing and resting on the bottom thereof. This frame is provided with transversely extending cross bars 28, as shown in Fig. 2, which support the bottom of the screen 26. As the brushes rotate and brush with considerable force across the screen they are bent backward and to reinforce them and prevent their being bent too far backward, there is provided on each brush bar 24 a backing plate such as 29 extending longitudinally across the bar and up a substantial distance along the back of each brush.

In order to adjust the screen supporting frame vertically so as to vary the pressure with which the brushes bear against the screen 26, we provide bars 30 at each side of the mixer casing C adjacent the grinder casing B and pivoted to the mixer casing beneath the top. The forward end of these bars are provided with pins 31 which bear against the lower face of the end cross bars 28 of the screen frame 27. The other end of each bar 30 is engaged by the lower end of a threaded stem 32 which extends through an opening in the top of the mixer casing and is provided on its upper end with a hand wheel 33 to rotate the stem and move it upward or downward in contact with the bar 30. The lock nut wheel 34 is provided to hold the stem in any adjusted position. By this means the screen frame can be raised or lowered and the pressure of the brushes on the screen adjusted as desired.

The bottom of the grinder casing B opens into the top of the mixer C at one end thereof. Adjacent this end of the mixer casing C, we provide two inlet pipes 35 and 36 for ground material, such as ground or granulated coffee, one inlet on each side. Two inlets are thus provided so that if the machine has to be located where one side is not accessible, the other side will be accessible for the introduction of material to be mixed with the ground material dropping from the grinder casing B. Longitudinally and centrally of the mixer casing C is a shaft 37 supported at each end in bearings 38 and 39 and having at the inlet end, outside the casing C, a bevel gear 40 meshing with a bevel pinion 41 mounted on shaft 21. One end of shaft 21 is provided with a pulley 42 from which a belt 43 extends forwardly to a suitable source of power, not shown, such as a small motor which may be mounted on the frame of the apparatus. The gear 40, pinion 41 and shaft 21 are covered substantially entirely by a guard casing 44.

At each end and at intervals throughout its length on the shaft 37 are mounted cross bars 45 forming supports for spirally disposed mixing blades 46, 47 and 48. The blade 46, as shown particularly in Fig. 3, is provided with a flange 49 of flexible material such as leather which extends beyond the outer periphery of the blade and brushes the inner surface of the mixer casing C. This blade is arranged in such spiral fashion as to convey the material within the mixer from the inlet to the discharge end from right to left in Fig. 1. The blades 47 and 48 are of opposite pitch and move the material in the opposite direction. These last two blades are spaced a definite distance away from the walls of the casing C so that they do not come in contact with the material lying immediately along the bottom of the mixer. The casing is provided on this upper portion with a pivoted cover 50 whereby the interior of the mixer may be observed from time to time.

Near the discharge end of the mixer C at the bottom at one side thereof we provide a discharge opening 51 connected to a pipe 52 leading to a funnel-shaped collector pipe 53. With the discharge opening 51 is associated a slidable gate 54 connected to a rack 55 with which the pinion 56 meshes. This pinion is mounted on a shaft 57 operated by hand-wheel 58 at one side of the mixer near the discharge end. This enables the size of this bottom discharge opening to be varied at will.

Figure 4:
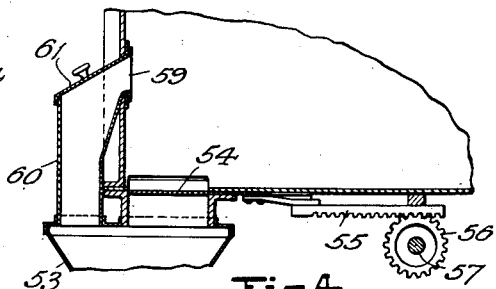
Fig. 4 is a partial longitudinal section through the lower end of the mixer showing the arrangement of discharge gates.
Figure 6:
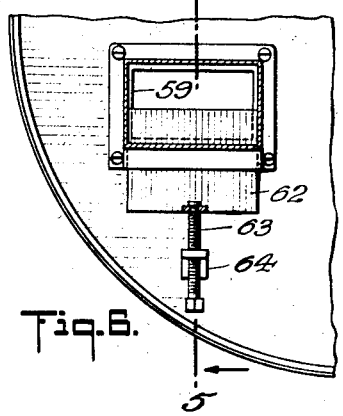
Fig. 6 is a partial end elevation of the discharge gate shown in Fig. 5.
Figure 8:
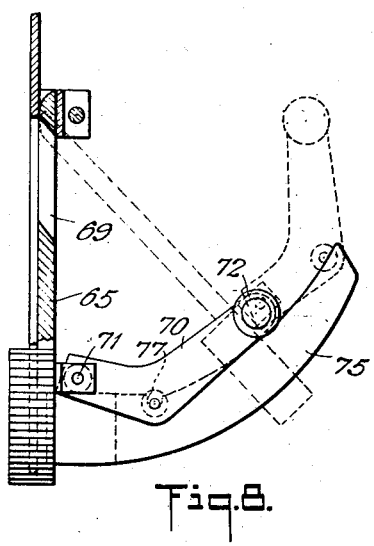
Fig. 8 is a side view of the form of gate shown in Fig. 7.
Figure 5:
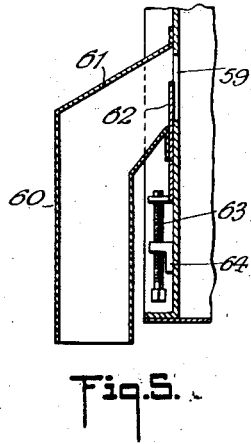
Fig. 5 is a section taken on the line 5—5 of Fig. 6 showing a modified form of discharge gate.

We provide another discharge opening 59 in the wall of the mixer at one side thereof, a suitable distance above the bottom of the mixer. This opening is connected to a pipe 60 having a pivoted cover 61 and leading to the funnel-shaped collector pipe 53. In the modification shown in Figs. 5 and 6, this opening 59 can be varied by a slidable gate 62, operated by a threaded bar 63 mounted in the bracket plate 64 connected to the outside of the wall of the mixer. This adjustment permits the lower level of the elevated discharge opening 59 to be adjusted at will. A still further modification of the construction of the apparatus for discharging material is shown in Figs. 7 and 8. In this form there is no bottom opening, such as 54 (see Fig. 4) but the wall at one side at the bottom thereof is broken away and against it is placed a plate 65 provided with brackets 66 mounted on a cross bar 67, the ends of which are supported in adjacent brackets 68. This plate has a normal opening 69 near the top thereof which corresponds to the opening 59, as shown in Fig. 4. Normally this plate is in the position shown in Fig. 8 closing the opening in the wall of the mixer.

We provide means, however, for opening this gate quickly and fully, when desired, in the form of a bar 70, pivoted at 71 to the lower portion of the plate or gate 65, having a handle 72 at its outer end. Laterally extending from the bar 70 is a lug 73 having an outwardly extending pin 74 thereon. This pin is adapted to ride along the upper surface of a cam plate 75, fastened to a bracket 76, disposed against the outer face of the wall of the mixer adjacent the gate 65 in its closed position, as shown in Fig. 8. By lifting the handle 72, the pin 74 can be removed from the notch 77 and the gate 65 moved to an upper position as shown in dotted lines in Fig. 8.

In the operation of the device, chaff and some fine coffee is drawn over by the suction created through the pipe 10 and drops into the separator casing 12, flowing downwardly into the grinder casing B where it is brushed between the brushes 25 and the screen 26 until it is gradually broken up into pieces fine enough to pass through the screen. During the brushing action it becomes thoroughly coated with the fine coffee and achieves the same color as the coffee. The determined fineness of the screen and the coating of the shaff will insure that when it is mixed with the granulated coffee it will not be readily apparent therein. As the chaff and granulated coffee are fed into the mixing drum, they are first fed toward the discharge end by means of the outer blade 46. As the material accumulates in the drum, it is engaged by the blades 47 and 48 spaced from the wall of the drum and moved in the opposite direction. These latter blades being greater in number than the former, will cause the mass of material to be moved more toward the inlet end than the discharge end. This tendency will therefore prevent material from flowing out at the discharge end until it is thoroughly mixed. As the resultant material in the trough of the drum reaches the lower level of the discharge opening 59, it commences to flow out at a rate equal to the inlet flow. By adjusting the height of the gate 62 the amount of retained material in the trough of the drum can be regulated.

We claim:

1. An apparatus for continuously mixing finely divided dry materials such as coffee and chaff, comprising a drum of substantial length providing for the accumulation of an appreciable amount of material therein, means for supplying the materials to be mixed at one end of the drum, there being a discharge outlet at the opposite end of the drum at an elevation above the bottom thereof so that there must be an accumulation of materials being mixed within the drum before the mixed materials can pass through said discharge outlet, conveying and agitating devices in said drum constructed to move the material more toward the inlet end than the outlet end so as to form a greater accumulation of material at the inlet end than at the outlet end of the drum, whereby the incoming materials are thoroughly agitated and mixed with previously accumulated material before being passed through the discharge outlet.

2. Apparatus as claimed in claim 1 wherein the conveying and agitating devices constitute a plurality of sets of spiral mixing blades, one set of blades being arranged to contact with the inner wall of the drum and feed the material toward the outlet end and the other set of blades being spaced from the drum wall and arranged to feed the material toward the inlet end, there being more blades in the latter set than in the former.

WILLIAM G. BURNS.
ARCHIBALD D. KIRKLAND.